United States Patent [19]
Wang et al.

[11] 3,928,370
[45] Dec. 23, 1975

[54] PROCESS FOR MAKING DIALKYL PYRIDYLPHOSPHATES
[75] Inventors: Chun Shan Wang; Michael J. Mintz, both of Midland, Mich.
[73] Assignee: The Dow Chemical Company, Midland, Mich.
[22] Filed: Sept. 3, 1974
[21] Appl. No.: 502,481

[52] U.S. Cl............ 260/297 P; 424/263; 260/543 P
[51] Int. Cl.$^2$........................................ C07D 213/00
[58] Field of Search................................ 260/297 P

[56] References Cited
UNITED STATES PATENTS
| | | | |
|---|---|---|---|
| 3,244,586 | 4/1966 | Rigterink | 424/200 |
| 3,686,191 | 8/1972 | Nishimura et al. | 260/294.8 K |
| 3,810,902 | 5/1974 | Rigterink | 260/297 P |

OTHER PUBLICATIONS
Katritzky et al., Journal of the Chemical Society, 1967 (b), pp. 758–761.
Pao, Acta Chimica Sinica, Vol. 27, pp. 160–161, (Nov. 1961).

*Primary Examiner*—John D. Randolph
*Attorney, Agent, or Firm*—L. Wayne White

[57] ABSTRACT

The title compounds have heretofore been prepared by reacting an alkali metal pyridinate with a dialkyl hydrogen phosphite and carbon tetrachloride. We have discovered that the process is substantially improved by adding a small but catalytic amount of a tertiary amine having a pKa of at least about 9.5. The presence of the tertiary amine greatly accelerates the reaction rate and substantially reduces the production of undesirable by-products, e.g. N-alkylpyridones.

9 Claims, No Drawings

PROCESS FOR MAKING DIALKYL PYRIDYLPHOSPHATES

BACKGROUND OF THE INVENTION

The dialkyl pyridylphosphates are extremely useful insecticides. The compounds are described, for example, by Rigterink in U.S. Pat. No. 3,244,586. The compounds may be represented by the formula

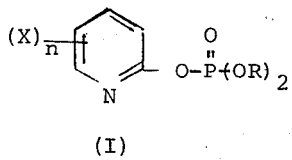

(I)

wherein X is fluoro, chloro or bromo; n is an integer of from 0 to 3, inclusive; and R is lower alkyl. Rigterink teaches that the phosphates are prepared from the corresponding alkali metal or ammonium pyridinates and dialkylphosphorochloridates; as illustrated by Equation 1.

These two classes of reactants are known and have known methods of preparation, as shown below.

Katritzky et al. indicated in the Journal of the Chemical Society, 1967(B), 758–761 that pyridones and pyridinols exist as tautomers. Equation 2.

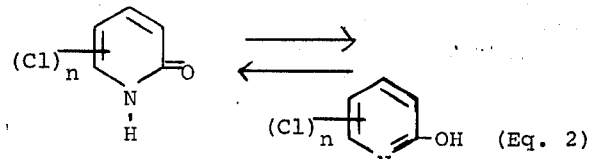

Rigterink et al., cited above, teach that the pryidinols react with alkali metals or protonated tertiary amines to give the corresponding alkali or ammonium pyridinate. Equation 3.

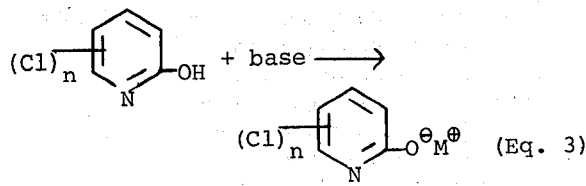

In Equation 3, the base may be, for example, an alkali metal (e.g. sodium) or a protonated tertiary amine.

Pao indicates in the Acta Chimica Sinica 27 (2), 160–161 that the dialkyl hydrogen phosphites react with carbon tetrachloride to give the corresponding dialkyl phosphorochloridates. Equation 4.

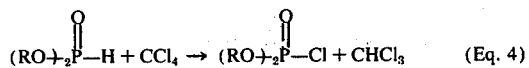

Equation 5 represents a "summation" of the reactions illustrated by Equations 1–4.

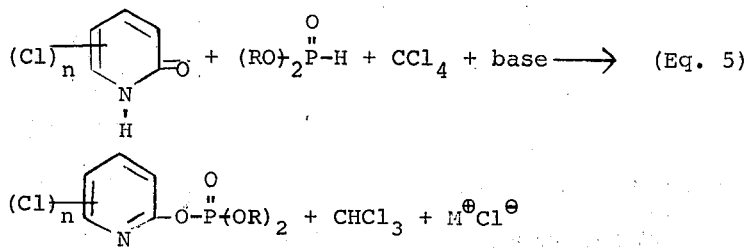

Nishimura et al. (U.S. Pat. No. 3,686,191) teach the generic reaction represented by Equation 6.

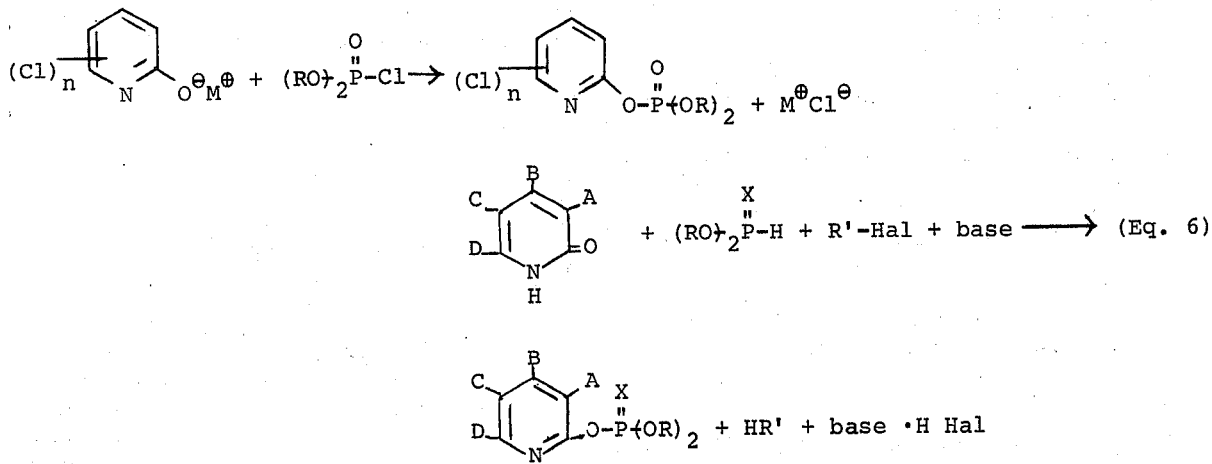

When the components used in Equations 1–5 are inserted into Equation 6, it becomes Equation 7.

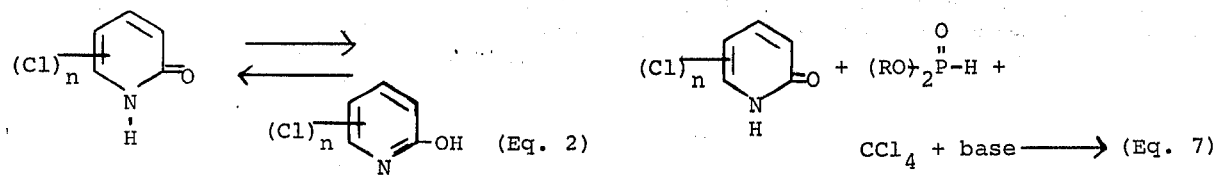

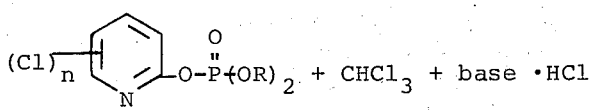 + $CHCl_3$ + base •HCl

Each example in the Nishimura et al. patent follows the stoichiometry represented by Equations 6 and 7 exactly. The reactions were conducted in a hydrocarbon solvent, such as benzene, and upon mixing of the reactants, the reaction mixture was maintained at reflux conditions for a period of several hours (e.g. 4 hours). Under these reaction conditions, N-substituted pyridones are formed in substantial amounts. The N-substituted pyridones are undesirable by-products which must be removed. Product purification is both time consuming and expensive, so there is an obvious advantage to any process which would substantially reduce or eliminate the production of such undesirable by-products.

SUMMARY OF THE INVENTION

In the process of preparing the O,O-dialkyl-O-pyridylphosphates (I) by reacting by contacting a. an alkali metal or ammonium pyridinate of the formula

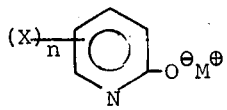

wherein M is an alkali metal and X and $n$ have the aforesaid meaning, b. a dialkyl hydrogen phosphite of the formula

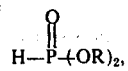

wherein R has the aforesaid meaning, and c. carbon tetrachloride, the improvement consisting of conducting said process in the presence of a small but sufficient amount of a tertiary amine to catalyze the reaction between (a), (b) and (c), said tertiary amine having a pKa of at least about 9.5.

The benefits realized by the improved process over the prior art are higher reaction rates, improved product yields, and increased product purity. The N-alkyl pyridones are produced in only minor amounts, if at all. Further benefits are derived from the fact that the instant process is normally conducted at a substantially lower temperature than the prior art reactions. Thermal degradation of the phosphate products is thus diminished and, there is an energy savings as well.

DETAILED DESCRIPTION OF THE INVENTION

The alkali metal or ammonium pyridinates, reactant (a), are a known class of compounds. They may be generated in situ, or in a separate reaction. However, it is advantageous to generate the reactant in a separate reaction. The most preferred reactants are those represented in (a) wherein $M^\oplus$ is a sodium ion.

The dialkyl hydrogen phosphites, reactant (b), are likewise a well known class of compounds. They correspond to the formula

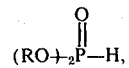

wherein each R is a lower alkyl radical of from 1 to 4 carbon atoms but is preferably methyl or ethyl and is most preferably methyl.

The amine catalysts are tertiary amines having a pKa of at least about 9.5. This is a physical property which is well known for most amines and is easily measured by conventional techniques. For example, a listing of amines and pKa values is found in the "Handbook of Organic Structural Analysis", Yasuhide Yakawa (Ed.) W. A. Benjamin, Inc., N.Y., N.Y. (1965) pages 587–588. The amine catalysts are used in the instant process in small but catalytic amounts (preferably from about 2 to about 10 mole percent, based on (a), (b) or (c), whichever is the lesser). Representative examples of suitable such amines include trialkyl amines (e.g. trimethylamine, triethylamine, tri-n-propylamine, tri-n-butylamine, methyldiethylamine, and the like); aralkyl-dialkylamines (e.g. benzyldiethylamine, benzyldipropylamine, and the like); 5- and 6- membered heterocyclic amines (e.g. N-methylpiperidine, N-ethylpiperidine, N-methylpyrrolidine, N-n-butylpyrrolidine, N-benzylpyrrolidine, and other like); and other like tertiary amines.

The reaction may be conducted neat at any convenient temperature so long as the reaction between (a), (b) and (c) occurs and the phosphate products can be recovered. We have found it advantageous, however, to normally run the reaction at a temperature of from about 20° to about 40°C (preferably between about 20° and about 30°C) in excess carbon tetrachloride as the liquid reaction medium/reactant. Other inert solvents can be used (e.g. benzene, toluene, etc.). Further, we prefer to conduct the instant reaction under substantially anhydrous conditions since water reacts with the dialkyl hydrogen phosphites to produce the corresponding phosphoric acids. Such phosphoric acids in turn react with the amine catalysts and/or with the sodium pyridinates and/or with the phosphate products, the net result of which is a lower product yield.

The following examples further illustrate the invention.

EXAMPLE 1

Preparation of dimethyl (3,5,6-trichloro-2-pyridyl)phosphate

Anhydrous sodium 3,5,6-trichloro-2-pyridinate (44.1 g, 0.2 mole), of carbon tetrachloride 175 ml and triethylamine (2 g, 0.02 mole) were slurried together at 20°C. Dimethyl hydrogen phosphite (22.2 g, 0.2 mole, 99 percent pure) was added to the stirred mixture in 3 increments over a 15 minute period, during which time the temperature of the reaction mixture was maintained below 30°C by external cooling. After the addition of dimethyl hydrogen phosphite was complete, the reaction mixture was stirred at 25°C for an additional 45 minutes. The reaction mixture was washed with water to remove sodium chloride and the carbon tetrachloride phase was concentrated under reduced pressure to approximately 70 ml. After the concentrate was cooled at −10°C for 4 hours, the slurry was filtered and the solid dried under reduced pressure to give 56.0 g (91.4 percent) of a white crystalline solid having a melting point of 91°–92°C. This material was identified by infrared spectroscopy as O,O-dimethyl O-(3,5,6-trichloropyridyl) phosphate. Product purity was greater than 99 percent with less than 0.05 percent of the undesirable by-product 3,5,6-trichloro-N-methyl-2-pyridone.

Tri-n-propylamine, tri-n-butylamine and diisopropylethylamine were used in an analogous series of experiments with similar good results.

EXAMPLE 2

Preparation of dimethyl (3,5,6-trichloro-2-pyridyl)phosphate

Anhydrous sodium 3,5,6-trichloro-2-pyridinate (44.1 g, 0.2 mole), of carbon tetrachloride (175 ml), and N-methylpiperidine (2.0 g, 0.02 mole) were slurried together at 20°C. Dimethyl hydrogen phosphite (23.5 g, 0.21 mole) was added to the stirred mixture while holding the reaction temperature between about 20° and about 30°C. The reaction was very exothermic. The reaction mixture was washed twice with 150 ml portions of water. The organic phase was separated from the wash water and concentrated to approximately 70 ml. After the concentrate was cooled at −10°C for about 4 hours, the slurry was filtered and the filtrate dried under reduced pressure. The dried product was a white crystalline solid (54.8 g, 89.4 percent yield) melting at 91°–92°C. The product was at least 99.1 percent pure and contained only about 0.02 percent 3,5,6-trichloro-N-methyl-2-pyridone.

In analogous reactions, N-methylpyrrolidine was used as the catalyst with similar good results.

To show the effect of the amines in the reaction, a series of experiments were conducted analogous to Example 1 except that no catalyst was present. At 25°C, the reaction was very slow and took several days. At 40°C, the reaction took approximately 6 hours and the reaction product was contaminated with about 4 percent by weight of N-methylpyridone. At 60°C, the reaction took approximately 2 hours and the product was contaminated with about 10 percent by weight of N-methylpyridone.

Preparation of dimethyl 3,5,6-trichloro-2-pyridylphosphate by the Rigterink process and the Nishimura et al. processes was in each instance plagued by the concurrent production of N-methylpyridone in amounts of about 10 percent by weight.

From this data, one observes that the tertiary amines having a pKa of at least about 9.5 are effective in catalyzing the reaction and raising the purity of the product at the expense of an undesirable by-product.

What is claimed is:

1. In the process of preparing a compound of the formula

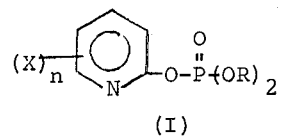

(I)

wherein
X is fluoro, chloro or bromo,
$n$ is an integer of from 0 to 3, inclusive, and
R is lower alkyl,
by reacting by contacting under substantially anhydrous conditions
a. an alkali metal or ammonium pyridinate of the formula

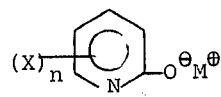

wherein M is an alkali metal and X and $n$ have the aforesaid meaning,
b. a dialkyl hydrogen phosphite of the formula

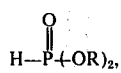

wherein R has the aforesaid meaning, and
c. carbon tetrachloride,
the improvement consisting of conducting said process in the presence of a small but sufficient amount of a tertiary amine to catalyze the reaction between (a), (b) and (c),
said tertiary amine having a pKa of at least about 9.5.

2. The process defined by claim 1 wherein $M^+$ is a sodium ion.

3. The process defined by claim 1 wherein R is methyl or ethyl.

4. The process defined by claim 1 wherein R is methyl.

5. The process defined by claim 1 wherein said process is conducted at a reaction temperature of from about 20° to about 40°C.

6. The process defined in claim 5 wherein said reaction temperature is from about 20° to about 30°C.

7. The process defined by claim 1 wherein said process is conducted in carbon tetrachloride as the liquid reaction medium.

8. The process defined by claim 1 wherein said tertiary amine is a trialkylamine, an aralkyldialkylamine or a 5- or 6- membered heterocyclic amine.

9. The process defined by claim 7 wherein: X is chloro; $n$ is 3; $M^+$ is a sodium ion; R is methyl or ethyl; said amine is triethylamine, tri-n-propylamine, tri-n-butylamine, diisopropylethylamine, N-methylpiperidine or N-methylpyrrolidine, and wherein said process is conducted at a reaction temperature of from about 20° to about 30°C.

* * * * *